(12) United States Patent
Kutsch et al.

(10) Patent No.: US 7,982,930 B2
(45) Date of Patent: Jul. 19, 2011

(54) PRESERVED AND ENHANCED HOLOGRAPHIC AND OPTICALLY VARIABLE DEVICES AND METHOD FOR MAKING THE SAME

(75) Inventors: Wilhelm P. Kutsch, Rio Verde, AZ (US); Frank J. Olsen, Jr., Stratham, NH (US)

(73) Assignee: Illinois Tool Works Inc, Glenview, IL (US)

( * ) Notice: Subject to any disclaimer, the term of this patent is extended or adjusted under 35 U.S.C. 154(b) by 644 days.

(21) Appl. No.: 11/004,360

(22) Filed: Dec. 3, 2004

(65) Prior Publication Data

US 2006/0119912 A1    Jun. 8, 2006

(51) Int. Cl.
   *G03H 1/18*    (2006.01)
(52) U.S. Cl. .................. 359/2; 156/209; 283/86
(58) Field of Classification Search .......... 359/2, 3, 359/569; 156/209; 283/86; 428/148
   See application file for complete search history.

(56) References Cited

U.S. PATENT DOCUMENTS

| | | | |
|---|---|---|---|
| 2,839,378 A | 6/1958 | McAdow | |
| 4,116,710 A | 9/1978 | Heikel | 106/290 |
| 4,856,857 A * | 8/1989 | Takeuchi et al. | 359/3 |
| 5,189,531 A | 2/1993 | Palmer et al. | |
| 5,464,710 A | 11/1995 | Yang | 430/1 |
| 5,549,774 A * | 8/1996 | Miekka et al. | 156/209 |
| 5,706,106 A | 1/1998 | Monaghan | 359/1 |
| 5,889,598 A | 3/1999 | Monaghan | 359/1 |
| 6,468,380 B1 | 10/2002 | Christuk et al. | 156/244.16 |
| 6,486,982 B1 | 11/2002 | Davis | 359/9 |
| 6,549,309 B1 | 4/2003 | Monaghan et al. | 359/27 |
| 6,863,851 B2 * | 3/2005 | Josephy et al. | 264/81 |
| 2002/0191233 A1 | 12/2002 | Ishimoto et al. | 359/1 |

FOREIGN PATENT DOCUMENTS

WO    WO 98/18635 A    5/1998
WO    WO 2004/005425 A    1/2004

* cited by examiner

*Primary Examiner* — Audrey Y Chang
(74) *Attorney, Agent, or Firm* — Houston Eliseeva, LLP

(57) ABSTRACT

An optically variable device has a substrate with an optically variable relief and a coating on the optically variable relief. The coating is applied as a liquid dispersion including a plurality of optical enhancer particles in a solvent.

27 Claims, 1 Drawing Sheet

PRESERVED AND ENHANCED HOLOGRAPHIC AND OPTICALLY VARIABLE DEVICES AND METHOD FOR MAKING THE SAME

FIELD OF THE INVENTION

The present invention relates to holography, and, more particularly, to holograms and/or diffraction gratings which are embossed or cast into a film.

BACKGROUND OF THE INVENTION

Holograms and diffraction gratings can be attached to a document or other articles containing printing and/or other information, such as a magnetic strip. For example, holograms are attached to credit cards in order to authenticate genuineness and increase the difficulty of counterfeiting credit cards. Holograms can be used as anti-counterfeiting devices on other types of documents, such as stock certificates, identification badges, passports, checks and even currency. Holograms and diffraction gratings are also attached to, or formed within, documents and articles for other reasons, such as for decorative effect. Packaging materials can have holograms and/or diffraction gratings for decorative or authenticating effects.

Holograms can be created by replicating the interference pattern of the hologram in a film via a surface contour in the film. When light is incident on this surface pattern, an observer views an image according to the information stored in the hologram. A diffraction grating can be made in a similar manner. When used for the purposes described above, the hologram or diffraction grating will typically be adjacent other materials, such as an adhesive, which can optically obscure the pattern of the device. There is a need therefore to preserve and enhance the patterns of the holograms and/or diffraction gratings.

More specifically, holographic and diffraction patterns for security and product enhancement purposes can be produced in a process which employs a carrier film onto which an embossable layer is deposited. The layers are embossed via a conventional holographic embossing process, after which the pattern is preserved and enhanced via vapor deposition of a metal, or vapor deposition of a material such as zinc sulfide which has an adequate difference of index of refraction versus the index of refraction of the embossable layer. In the vapor deposition process, the evaporated material forms a layer on the pattern, preserving the pattern. The pattern is further processed by either depositing a heat-activated adhesive or a pressure sensitive adhesive.

An example of the vapor deposition process for preserving a holographic pattern is a vacuum metallization process. In this process, a roll of material is placed in a vacuum chamber that contains a heating system and a roll of aluminum wire. The heating system includes an inter-metallic boat, furnace or crucible, that acts like a resistor and is subjected to very high heat. The aluminum wire is fed into the boat, and as it contacts the boat, the metal is vaporized. Concurrently, the roll of material containing holographic patterns is unwound, passed over a series of guide rolls and a chilled roll, and then rewound. The evaporated aluminum forms a layer on the film of material to preserve and enhance the image created by the holographic pattern. Although this known system has proven to be useful, the equipment required to perform the process is generally expensive to make and operate. Further, this method does not desirably lend itself to selective application of the metal, as is desired when the holographic pattern only covers a fraction the area of the material. Instead, the entire surface exposed in the chamber is covered by the vapor. Coating the non-holographic areas adds undesirable waste and cost to the process and end product.

What are needed in the art are preserved and enhanced holographic and diffraction patterns and a method for making them which are relatively inexpensive to make and operate, and which are capable of selectively applying the material to preserve and enhance the patterns.

SUMMARY OF THE INVENTION

The present invention provides preserved and enhanced holographic and diffraction patterns having a coating of optical enhancer particles applied as a liquid dispersion of optical enhancer particles in a solvent.

In one aspect thereof, the present invention provides an optically variable device with a substrate having an optically variable relief and a coating on the optically variable relief. The coating includes optical enhancer particles in a solvent In another aspect thereof, the present invention provides an optically variable device which includes a substrate with an optically variable relief and optical enhancer particles on the optically variable relief.

In a further aspect thereof, the present invention provides a method of enhancing an optically variable device. The method provides a substrate with an optically variable relief, and a liquid dispersion with a plurality of optical enhancer particles in a solvent. The method further includes applying the liquid dispersion on the optically variable relief and maintaining a consistent thickness of the optical enhancer particles on the optically variable relief.

An advantage of the present invention is that it preserves an optically variable relief.

Another advantage of the present invention is that it enhances an optically variable relief.

A further advantage of the present invention is that it is economical to produce.

A yet further advantage of the present invention is that it can be selectively applied to portions of a substrate, in particular, portions of the substrate which include an optically variable relief.

A yet further advantage of the present invention is that it is economical from a capital investment perspective.

Other features and advantages of the invention will become apparent to those skilled in the art upon review of the following detailed description, claims and drawings in which like numerals are used to designate like features.

Figure 1:
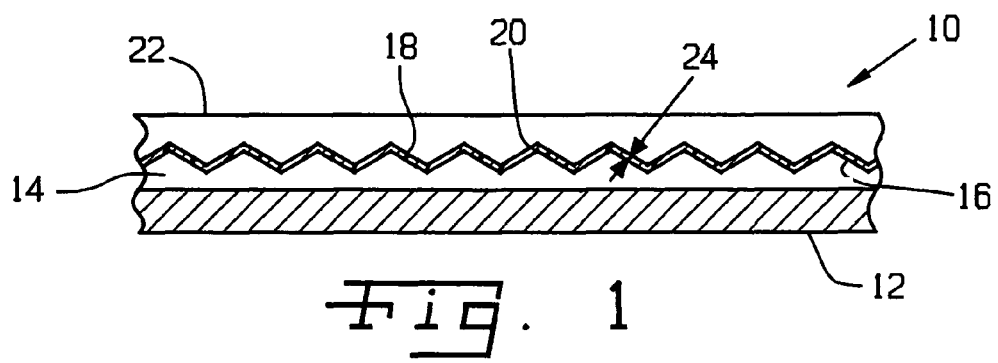
FIG. 1 is a cross-sectional view of an optically variable device of the present invention with a substrate which includes an embossable layer with an optically variable relief.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now to the drawings, and more particularly to FIG. 1, there is shown an optically variable device 10 which generally has a substrate 12 having an embossable layer 14 thereon. Embossable layer 14 includes an optically variable relief 16 formed therein. A coating 18 on optically variable relief 16 includes a plurality of optical enhancer particles 20 applied as a dispersion in a solvent. Optically variable device 10 can include a layer 22, such as an adhesive layer and/or a protective layer, applied on the plurality of optical enhancer particles 20.

Embossable layer 14 can be embossed with optically variable relief 16 by a holographic embossing process, for example.

Optically variable relief 16 can be at least one of a holographic pattern and a diffraction grating.

Coating 18 can include optical enhancer particles 20 in the form of aluminum platelets or flakes with a relatively controlled particle size, provided as a dispersion in a solvent. The aluminum flake dispersion can be produced from vapor deposited aluminum metal which is deposited onto polymer release coated film, such as polyethylene terephthalate (PET), and then stripped off the film carrier and processed to a fine particle size of approximately 10-13 micron or less. Multiple vapor deposited layers can be separated by polymeric release coatings, to yield thin platelets when stripped from the film. The polymeric release coat is soluble in an organic solvent, which facilitates stripping the metal/polymer layers from the film carrier and allows for pumping a slurry of the stripped fragments from the stripping tank to equipment that further processes the metal flake suspension into a more concentrated, finely dispersed slurry, of controlled particle size (of 10-13 micron), and normally about 10-20% metal flake content The use of fine particle size aluminum flakes or platelets having a brilliant luster intensifies and preserves a holographic image to a similar degree as if a metal, metal oxide or high index of refraction coating were vapor deposited directly onto the embossed image, such as optically variable relief 16.

Vapor deposited metals, metal oxides or high index of refraction material, such as zinc sulfide, have been used to preserve and enhance a holographic image. An accepted rule for using a high or low index of refraction coating, is that there should be a minimum of 0.5-1.0 difference between the index of refraction of the embossable polymer or polymer film, and the index of refraction of the image enhancer. Known polymers used as substrate 12 and/or embossable layer 14, such as acrylics, have an index of refraction in the range of 1.45-1.65. Preferably the index of refraction of the image enhancer should be substantially higher or lower. A material having an index of refraction of 2.1-2.2, as in the case of zinc sulfide, makes an excellent transparent image preserver and enhancer. The image can also be preserved by using other high index of refraction liquid coatings where a minimum difference of index of refraction of ±0.2 or more is recommended.

In one embodiment, the present invention provides a slurry or dispersion produced from vapor deposited aluminum metal enhancer particles 20 in the form of flakes or platelets that are between about 10 and 30 nanometers thick and have a controlled particle size. Particles 20 preserve and enhance optically variable relief 16 when applied onto optically variable relief 16. The aluminum flake dispersion can be viewed much like a dispersion of microscopically thin micromirrors that form a brilliant surface when applied into optically variable relief 16, and provide a reflectivity similar to the reflectivity of vapor deposited metal. Metal dispersions are available from Wolstenholme International Ltd. and from Eckart GmbH & Co. KG., with metal flakes suspended in various organic solvents compatible with various polymers that may be used as substrate 12 and/or embossable layer 14. Water-borne dispersions also are available.

In order to produce a solvent based liquid dispersion to preserve and/or enhance optically variable relief 16, sufficient solvent is added to dilute the slurry to a viscosity that allows applying the flake suspension/dispersion via commercial coating or printing methods. To produce a water solvent based liquid dispersion, either water is added, or a mixture of alcohol and water is added to dilute the slurry to a viscosity that will allow coating the flake suspension/dispersion via commercial coating or printing methods.

The present invention allows for the use of commercial printing and coating methods such as gravure, flexography, rotogravure, offset, intaglio and lithography to deposit a thin reflective coating 18 of the aluminum metal flake particles 20 onto optically variable relief 16. The dispersion can be applied as an overall coating across the web, or spot printed directly onto an image, leaving the surrounding area uncoated. The aluminum flake dispersion or coating is dried via conventional drying methods on the coating/printing equipment. The present invention is not limited to the above commercial printing methods; other commercial printing, coating and spray application methods can be employed.

In the present invention, optical enhancer particles 20 can contain a small amount of release coat polymer, which is not removed during the rinsing process of the flake, and which can remain bonded to the flake. The small percentage of residual polymer is sufficient to form a film that has sufficient adhesion to optically variable relief 16. If necessary, a small amount of polymer can be added. However, since most polymers with average index of refraction of 1.45-1.65 (neither high or low) can render the slurry unsuitable to preserve the image (because it either matches the index of refraction of the embossable surface 14 or does not vary substantially from the polymer), the amount of additional polymer added to the slurry must remain small, typically in the 0.1%-1.0% range based on total volume.

A protective or adhesive layer 22 can be deposited over optically variable relief 16 (preserved by coating 18, and more particularly, optical enhancer particles 20), if needed. Care is taken to select protective or adhesive layer 22 such that coating 18 or optical enhancer particles 20 are not attacked or otherwise degraded.

If optically variable relief 16 is embossed into a polymeric layer, care is taken not to attack or dissolve the embossable layer, with coating 18, and particularly the solvent used in making the dispersion. Preferably, a water based metal flake dispersion is employed for coating 18, which does not attack or dissolve the polymeric embossable layer 14, and does not erase optically variable relief 16. If needed, a small amount of additional polymer can be added to the water based dispersion, but the amount added depends on the organic residuals in the slurry and is kept small enough in order not to interfere with the image preservation.

Optical enhancer particles 20 can have a complex index of refraction such as common in reflective metals; or can be a purely refractive material. Optical enhancer particles 20 can include metals such as aluminum, as described above. Chromium, indium, bismuth, silver, gold, etc. are also suitable, but the invention is not limited to those metals. Metal oxides, such as aluminum oxide, and non-metal oxides, such as silicone monoxide and silicon dioxide, also are suitable. A high index of refraction inorganic such as zinc sulfide is also suitable. A slurry is prepared from the above products, and processed into a fine particle size similar to the aluminum flake dispersion described above.

In general, optical enhancer particles can be comprised of a metal and/or a plurality of metal flakes. Substrate 12 can include a first index of refraction (which may be the index of refraction of embossable layer 14), and the plurality of optical enhancer particles 20 can include a second index of refraction. A difference between the first index of refraction and the second index of refraction can be preferably greater than ±0.2.

Coating 18 can provide a consistent thickness 24 of optical enhancer particles 20 on optically variable relief 16. Consistent thickness 24 can be, for the example of aluminum flakes, in a range of approximately between 10 and 30 nanometers, or multiples of such a range. Each of optical enhancer particles 20 can be approximately between 10 and 13 microns in a direction approximately transverse to consistent thickness 24. The flake structure of optical enhancer particles 20 allows optical enhancer particles 20 to orient themselves in consistent thickness 24, i.e., particles do not stand on edge. The flake structure and size of particles 20 are sufficiently small to fit into optically variable reliefs 16, without pooling.

Pre-forming substrate 12 with embossable layer 14 is desirable, but optically variable reliefs 16, such as holographic patterns and diffraction gratings, can be directly embossed into polyethylene terephthalate (PET) films, without an embossable layer 14. Additionally, co-extruded biaxially oriented polypropylene (BOPP) can be embossed with optically variable reliefs, for use in laminations. Variations and modifications of the foregoing are within the scope of the present invention.

Figure 2:
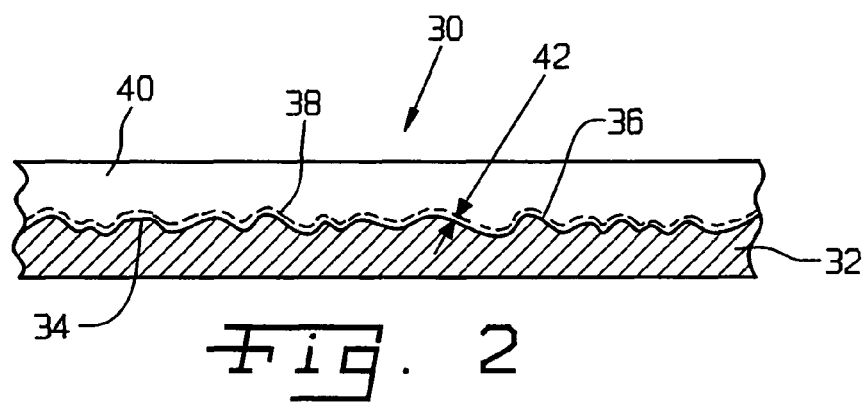
FIG. 2 is a cross-sectional view of an optically variable device of the present invention with a substrate which includes an optically variable relief.

In the embodiment of FIG. 2, optically variable device 30 includes substrate 32 onto which is directly applied optically variable relief 34. A coating 36 (similar to coating 18 as described previously) on optically variable relief 34 includes a plurality of optical enhancer particles 38 (similar to optical enhancer particles 20 as described previously) in a solvent. Optically variable device 30 can include layer 40 which can be a protective and/or adhesive layer, for example. Coating 36 can provide a thickness 42, which can be a consistent thickness, of optical enhancer particles 38 on optically variable relief 34.

Although optically variable relief 16 is depicted as more of a periodic structure, and optically variable relief 34 is depicted as more of a non-periodic structure, either of optically variable relief 16 or optically variable relief 34 can have a structure which is periodic or non-periodic or a combination thereof. Further, although optical enhancer particles 20 are shown in a relatively continuous layer and optical enhancer particles 38 are shown disjointed or discontinuous, either optical enhancer particles 20 or optical enhancer particles 38 can form a layer or layers which are continuous, discontinuous, overlapping or some combination thereof.

Other layers can be added to either optically variable device 10 or optically variable device 30 as are required.

Figure 3:
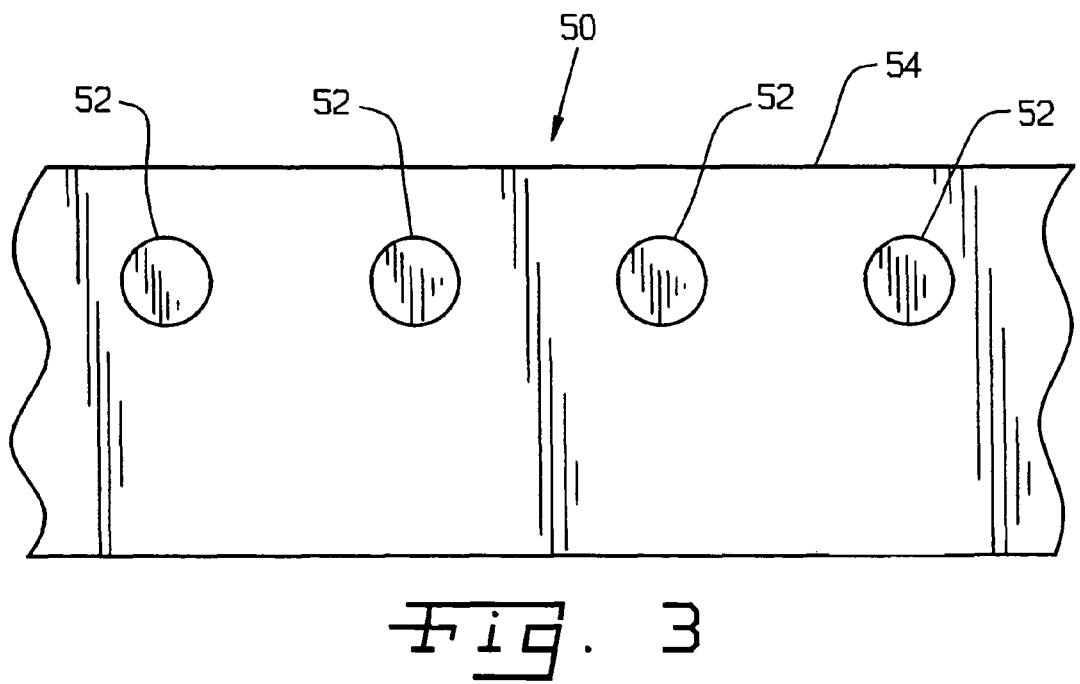
FIG. 3 is a plan view of an optically variable device of the present invention where the liquid dispersion is selectively applied to a predetermined portion of the substrate of the optically variable device.

The liquid dispersion of the present invention can be applied by readily available printing methods, and other application methods, as previously described, which allows for selective application of the liquid dispersion thereby achieving cost savings in materials and capital equipment. FIG. 3 illustrates a plan view of an optically variable device 50 of the present invention where the liquid dispersion is selectively applied to predetermined portion(s) 52 of a substrate 54 of the optically variable device. Each of predetermined portions 52 can have the cross-sectional characteristics of either FIGS. 1 and/or 2, and other corresponding characteristics, as previously described. For example, substrate 54 can include an embossable layer with an optically variable relief and/or can have the optically variable relief on substrate 54 with no embossable layer. Additionally, the optically variable relief can cover an entire surface of substrate 54, can cover only predetermined portions 52, or some combination thereof.

In use, the present invention includes a method of enhancing an optically variable device, with steps of: providing both a substrate 12, 32, 54 having an optically variable relief 16, 34 and a dispersion having a plurality of optical enhancer particles 20, 38 in a solvent; applying the dispersion as a coating 18, 36 on optically variable relief 16, 34; and maintaining a consistent thickness 24, 42 of optical enhancer particles 20, 38 on optically variable relief 16, 34. The applying step can selectively apply coating 18, 36 to a predetermined portion 52 of the substrate. The dispersion for coating 18, 36 can be selected to limit a size of each of optical enhancer particles 20, 38 to approximately between 10 and 13 microns. The applying step can use a printing technique or other coating, spray or application techniques.

It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An optically variable structure, comprising:
  an optically variable relief embossed on a polymer substrate or an embossable polymer layer; and
  a liquid dispersion coating on said optically variable relief, said liquid dispersion coating comprising an amount of a residual polymer bonded to a plurality of optical enhancer particles during their production and the plurality of optical enhancer particles having an index of refraction differing by a minimum of ±0.2 from that of the polymer substrate or the embossable polymer layer, the amount of the residual polymer providing adhesion of the plurality of optical enhancers to the polymer substrate.

2. The optically variable structure of claim 1, wherein said polymer substrate or the embossable polymer layer includes at least one predetermined portion, and said liquid dispersion coating is selectively applied to said at least one predetermined portion.

3. The optically variable structure of claim 1, wherein a size of each of said plurality of optical enhancer particles is approximately between 10 and 13 microns.

4. The optically variable structure of claim 1, wherein said liquid dispersion coating provides a consistent thickness of said plurality of optical enhancer particles on said optically variable relief.

5. The optically variable structure of claim 1, wherein said optically variable relief is at least one of a holographic pattern and a diffraction grating.

6. The optically variable structure of claim 1, wherein said plurality of optical enhancer particles includes at least one of aluminum, chromium, indium, bismuth, silver, gold, aluminum oxide, silicon monoxide, silicon dioxide, and zinc sulfide.

7. The optically variable structure of claim 1, wherein said liquid dispersion coating is of a suitable viscosity to be applied on said optically variable relief by a printing technique.

8. The optically variable structure of claim 1, wherein said plurality of optical enhancer particles is a plurality of metal flakes.

9. The optically variable structure of claim 8, wherein said liquid dispersion coating comprises a solvent.

10. The optically variable structure of claim 1, further comprising a protective layer applied on said plurality of optical enhancer particles.

11. The optically variable structure of claim 1, further comprising an adhesive layer applied on said plurality of optical enhancer particles.

12. The optically variable structure of claim 1, wherein said liquid dispersion coating comprises a solvent.

13. The structure of claim 1, wherein the liquid dispersion further comprises an additional polymer in a binder to flake ration being less than 0.01.

14. An optically variable device, comprising:
an optically variable relief embossed on a polymer substrate or an embossable polymer layer; and
a plurality of optical enhancer particles in a film of coating applied on said optically variable relief and bonded to the optically variable relief by a residual polymer bonded to the plurality of optical enhancer particles during their production, the film of coating having a thickness in a range between 10 and 30 nanometers or multiples of that range, a size of each of said plurality of optical enhancer particles in the film of coating being between 10 and 13 microns.

15. The optically variable device of claim 14, wherein said polymer substrate or the embossable polymer layer includes at least one predetermined portion, and said film of coating is selectively applied to said at least one predetermined portion.

16. The optically variable device of claim 14, wherein said plurality of optical enhancer particles is a plurality of metal particles.

17. The optically variable device of claim 14, wherein said optically variable relief is at least one of a holographic pattern and a diffraction grating.

18. The optically variable device of claim 14, wherein said plurality of optical enhancer particles comprises at least one of aluminum, chromium, indium, bismuth, silver, gold, aluminum oxide, silicon monoxide, silicon dioxide, and zinc sulfide.

19. The optically variable device of claim 14, wherein a difference between a first index of refraction of the polymer substrate or the embossable polymer layer and a second index of refraction of the plurality of optical enhancer particles is greater than ±0.2.

20. The optically variable device of claim 14, further including a protective layer applied on said film of coating with the plurality of optical enhancer particles.

21. The optically variable device of claim 14, further including an adhesive layer applied on said film of coating with the plurality of optical enhancer particles.

22. The optically variable device of claim 14, wherein the amount of the residual polymer is sufficient to bond the plurality of optical enhancer particles to the optically variable relief.

23. A method of enhancing an optically variable structure, comprising the steps of:
providing an optically variable relief embossed on a polymer substrate or an embossable polymer layer; and
forming a film with a thickness in a range between 10 and 30 nanometers or multiples of that range over the optically variable layer by applying a liquid coating to the optically variable relief, the liquid coating comprising an amount of a residual polymer bonded to a plurality of optical enhancers during their production and the plurality of optical enhancer particles of a size between 10 and 13 microns having an index of refraction differing by a minimum of ±0.2 from that of the polymer substrate or the embossable polymer layer, the amount of the residual polymer providing adhesion of the plurality of optical enhancers to the polymer substrate.

24. The method of claim 23, wherein said applying the liquid coating step selectively applies said liquid coating to a predetermined portion less than all of said substrate.

25. The method of claim 23, wherein said applying the liquid coating step uses a printing technique.

26. The method of claim 23, wherein said applying the liquid coating step includes selecting said liquid coating so that said plurality of optical enhancer particles is a plurality of metal particles.

27. The method of claim 23, wherein the liquid coating further comprises an additional polymer in a binder to flake ration being less than 0.01.

* * * * *